(12) United States Patent
Miller

(10) Patent No.: US 6,435,299 B1
(45) Date of Patent: Aug. 20, 2002

(54) PROPELLER SHAFT DEFLECTOR

(75) Inventor: Ryan Miller, Columbus, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/795,863

(22) Filed: Feb. 28, 2001

(51) Int. Cl.[7] .............................................. B60K 17/24
(52) U.S. Cl. ...................................... 180/381; 180/379
(58) Field of Search ............................... 180/376, 379, 180/380, 381, 312, 232; 384/536, 581, 582; 464/180

(56) References Cited

U.S. PATENT DOCUMENTS

| | | | | |
|---|---|---|---|---|
| 2,155,953 | A | * | 4/1939 | Nyland ........................ 180/381 |
| 2,162,159 | A | * | 6/1939 | Cole ............................ 384/536 |
| 2,857,974 | A | * | 10/1958 | Heller ......................... 180/381 |
| 2,939,748 | A | * | 6/1960 | Leach ......................... 384/536 |
| 3,047,345 | A | * | 7/1962 | Burton et al. ............... 384/536 |
| 3,466,104 | A | * | 9/1969 | Norrie et al. ............... 384/536 |
| 3,805,911 | A | | 4/1974 | Le Salver |
| 4,392,694 | A | * | 7/1983 | Reynolds .................... 384/536 |
| 4,540,305 | A | | 9/1985 | Geisthoff et al. |
| 4,722,618 | A | * | 2/1988 | Matsumoto et al. ........ 384/536 |
| 4,732,230 | A | | 3/1988 | Sakata |
| 5,096,236 | A | | 3/1992 | Thony |
| 5,409,262 | A | * | 4/1995 | McLennan |
| RE36,270 | E | * | 8/1999 | Duggan .................. 384/536 X |
| 6,030,127 | A | | 2/2000 | Kang |
| 6,030,128 | A | | 2/2000 | Pontzer |
| 6,276,837 | B1 | * | 8/2001 | Iwano ........................ 384/536 |

FOREIGN PATENT DOCUMENTS

| | | | |
|---|---|---|---|
| JP | 6296137 | * | 5/1987 |
| JP | 289819 | * | 3/1990 |
| JP | 1035304 | * | 2/1998 |

\* cited by examiner

Primary Examiner—Brian L. Johnson
Assistant Examiner—Bryan Fischmann
(74) Attorney, Agent, or Firm—Rankin, Hill, Porter & Clark LLP

(57) ABSTRACT

A central support structure for a vehicle propeller shaft. The support structure includes a support bracket, an annular support, and a deflector. The deflector is disposed relatively above the propeller shaft and forward of the support bracket. In the event of a front-end collision, the deflector is adapted to direct or guide the propeller shaft through the support bracket and thereby enhance the crash stroke of the vehicle.

12 Claims, 4 Drawing Sheets

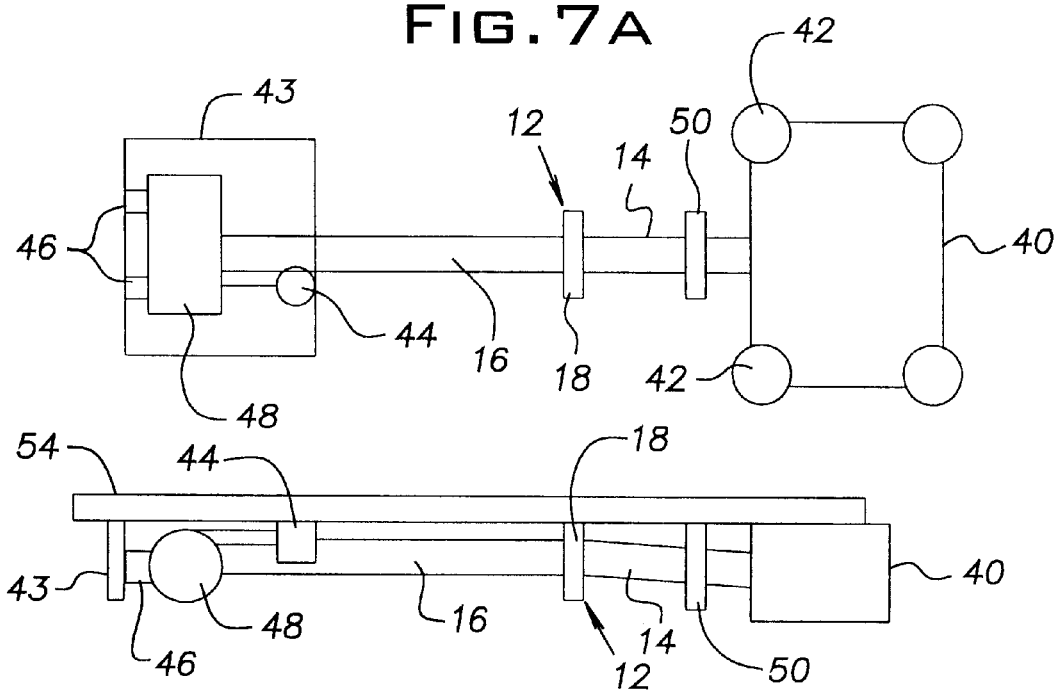
FIG. 7A
FIG. 7B
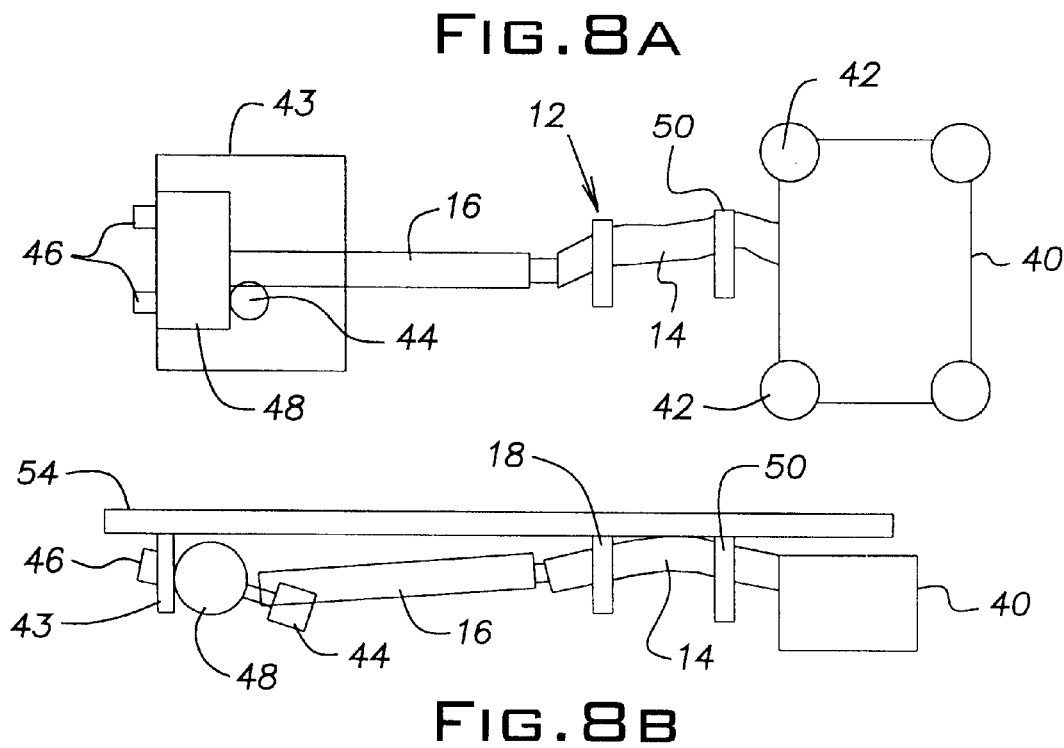
FIG. 8A
FIG. 8B

PROPELLER SHAFT DEFLECTOR

BACKGROUND OF THE INVENTION

1. Field of the Invention

The present invention pertains generally to automobile drive systems and, more particularly, to vehicle assemblies that are adapted to permit movement or travel of the engine and other structural components in the event of a front-end collision.

2. Description of Related Art

When a vehicle is involved in a front-end collision, it is important that the engine and other structural components of the vehicle be permitted sufficient space to crush or otherwise move and help absorb the kinetic energy of the crash. In the most severe crashes, the crush space is insufficient and components of the vehicle engine and structural assembly may be forced into the passenger compartment.

While crumple zones in the body panels and frame are constructed to provide a desired impact-absorption, the overall ability of the vehicle to absorb the load of front-end collisions has always been limited by the drive train, especially in vehicles having driven rear-wheels (i.e., either rear wheel or four wheel drive vehicles). This limitation is due, in part, to the rigid connection existing between the engine and the rear drive shaft, which is embodied by the propeller shaft.

The propeller shaft can be of one piece or two-piece construction. In either case, a center of the propeller shaft is typically guided by a center support to prevent sagging. A conventional two-piece propeller shaft and center support is taught by U.S. Pat. No. 4,732,230, the disclosure of which is expressly incorporated herein in its entirety. The center support normally includes a resilient casing that is surrounded by a U-shaped bracket. The casing and bracket cooperate to support the weight of the shaft and, in the case of two-piece propeller shafts, is adjacent the joint or connection between the two propeller pieces. Unfortunately, in front-end collisions, the center support is also the location at which the propeller shaft jams against the under-surface of the vehicle, thereby limiting the rearward stroke of the engine.

The conventional solution to this problem has been to manufacture the propeller shaft so that it breaks when involved in a crash. However, due to the many types of crashes, each with different severity and load, this solution has been found to not be empirically reliable, and may lead to inconsistent results. Therefore, there exists a need in the art for a method and device for facilitating rearward movement of the propeller shaft relative to the center support in the event of a front-end collision. There also exists a need in the art for a device and method to increase the crash stroke of the engine during a front-end collision.

SUMMARY OF THE INVENTION

The present invention is directed toward a device that guides the propeller shaft rearwardly in the event of a front-end collision, and helps to prevent jamming of the propeller shaft. The present invention is further directed toward a device that effectively increases the vehicle crash stroke and absorption of energy by the vehicle in the event of a front-end collision.

In accordance with one aspect of the present invention, an improved central support structure for a vehicle propeller shaft is provided. The central support structure is disposed at a predetermined position along the length of the propeller shaft and is adapted to support the propeller shaft vertically relative to a lower surface of the vehicle. The support structure permits and facilitates movement of the propeller shaft rearwardly during a front-end collision between the vehicle and another object.

In further accordance with the present invention, the central support structure includes a support bracket, a resilient annular support, and a deflector. The support bracket is secured to a lower surface of the vehicle at a predetermined position and surrounds at least a lower portion of the propeller shaft. The resilient annular support substantially surrounds the propeller shaft at the predetermined position and is supported by the support bracket. The deflector is secured to the lower surface of the vehicle adjacent the predetermined position. The deflector is sized and positioned so as to guide the propeller shaft through the support bracket during a front-end collision.

In further accordance with the present invention, the deflector includes a curved surface that faces toward the propeller shaft. During a front-end collision, the curved surface is engaged by the propeller shaft and directs the propeller shaft through the support bracket.

In further accordance with the present invention, the propeller shaft has a longitudinal axis and a rotational direction. At least a portion of the deflector is disposed at a position relatively forward of the predetermined position and offset from the longitudinal axis in the rotational direction.

BRIEF DESCRIPTION OF THE DRAWINGS

These and further features of the invention will be apparent with reference to the following description and drawings, wherein:

FIGS. 7a and 7b schematically illustrate a top and side view, respectively, of the components prior to a front-end collision; and, FIGS. 8a and 8b schematically illustrate a top and side view, respectively, of the components following a front-end collision.

DETAILED DESCRIPTION OF THE PREFERRED EMBODIMENT

Figure 1:
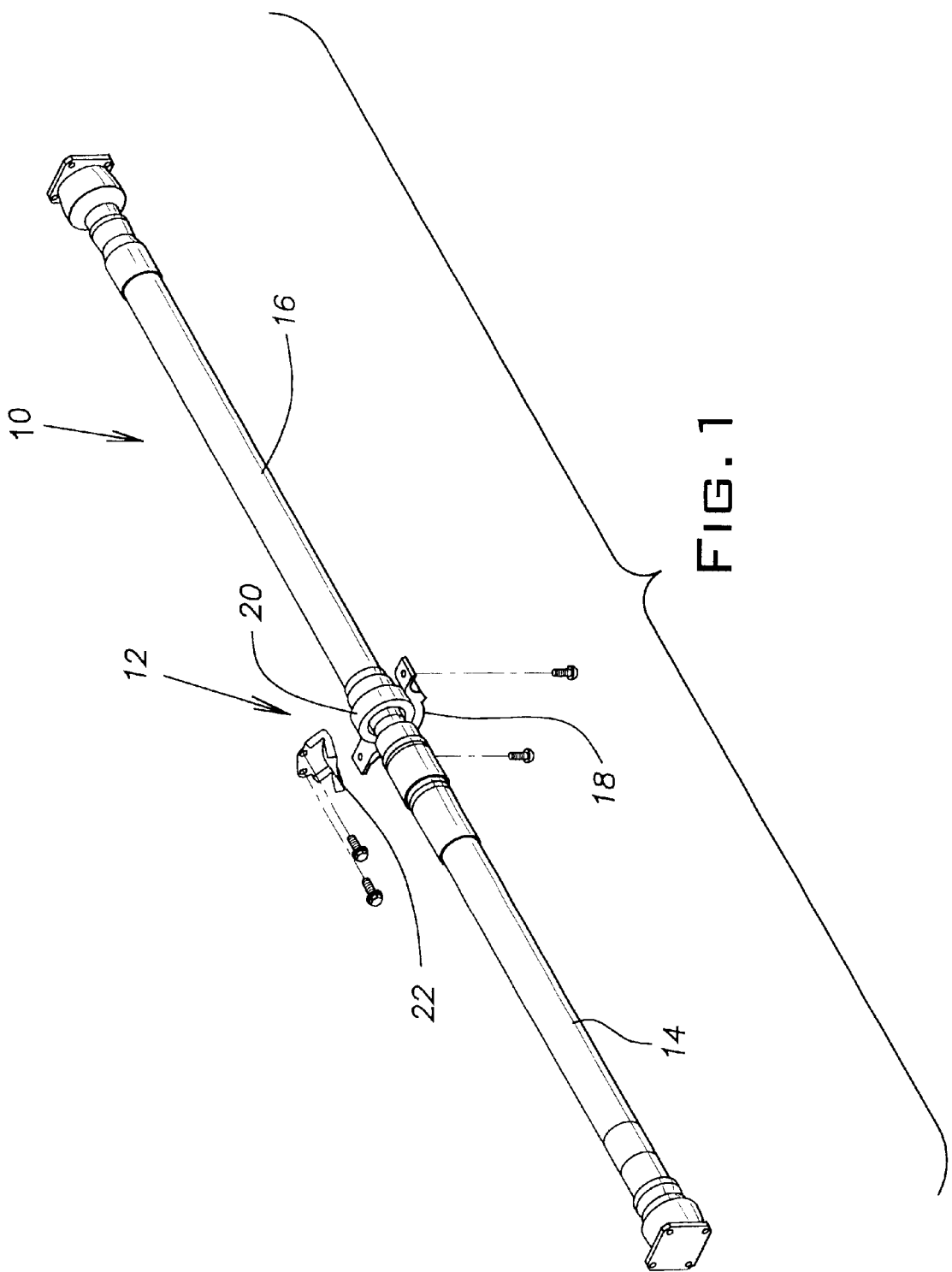
FIG. 1 is a partially exploded perspective view of the propeller shaft, support bracket, and deflector according to the present invention.
Figure 2:
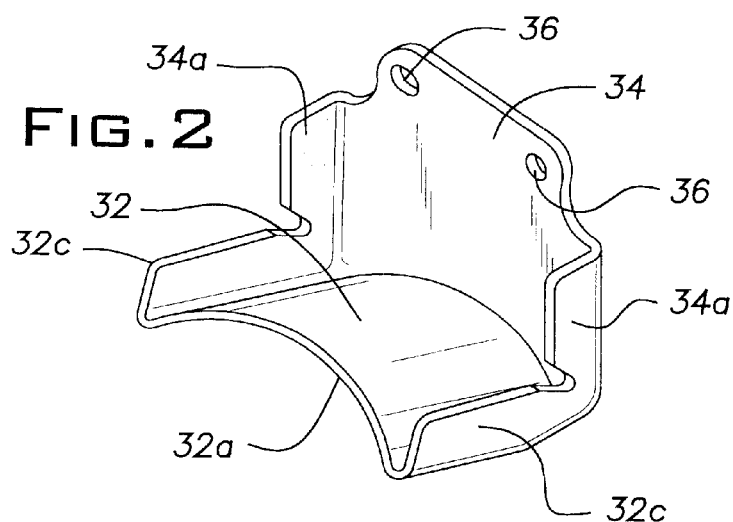
FIG. 2 is a top and right side perspective view of the deflector.
Figure 5:
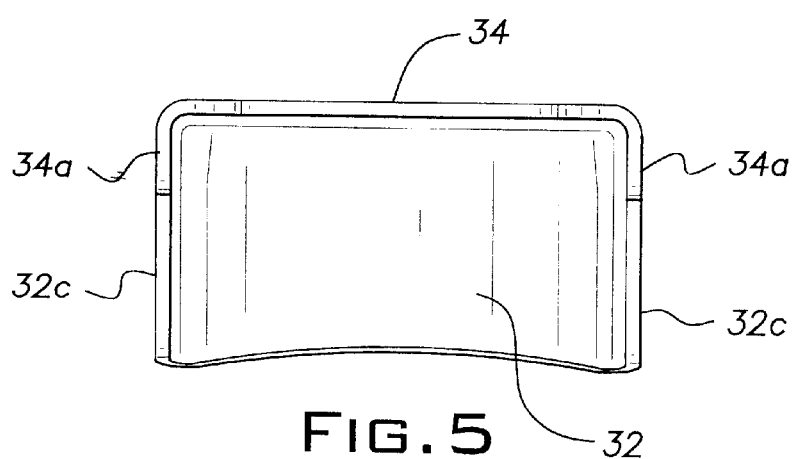
FIG. 5 is a top plan view of the deflector.
Figures 3, 4:
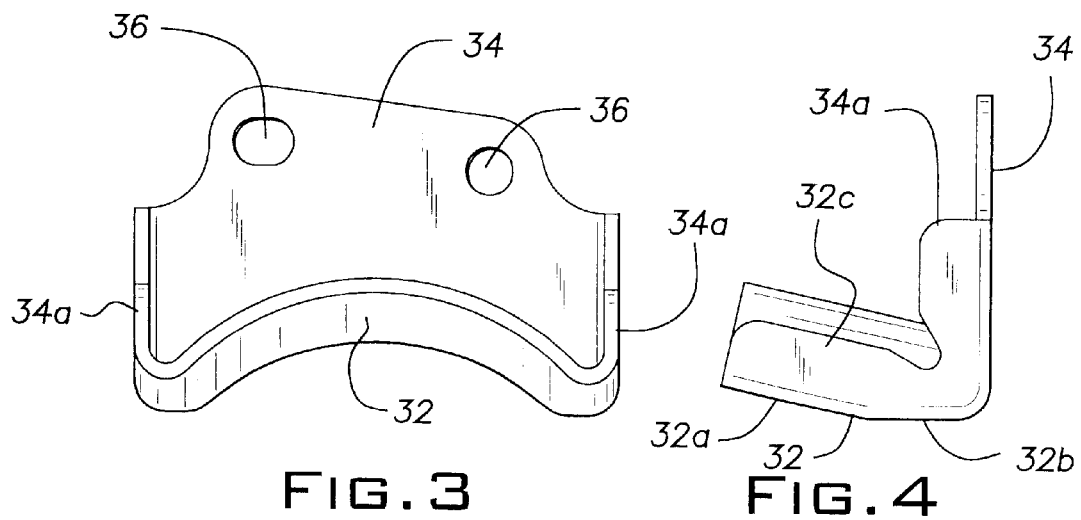
FIG. 3 is a front elevational view of the deflector.
FIG. 4 is a right side elevational view of the deflector.

With reference to the drawings, the propeller shaft 10 and the central support 12 of the propeller shaft are illustrated. The illustrated propeller shaft 10 is formed in two pieces, having a front propeller shaft 14 and a rear propeller shaft 16. However, as will be apparent from the following and keeping in mind that central supports are used on all propeller shafts, the present invention is equally applicable to one-piece propeller shafts.

The central support 12 is provided adjacent the joint or union of the front and rear propeller shafts, and includes a support bracket 18, a resilient annular support member 20, and a deflector 22. The joint or union between the front and rear propeller shafts is conventional in the art, and includes a bell-shaped forward end of the rear propeller shaft 16 being placed around a rearward end of the front propeller shaft 14. The joint or union between the front and rear propeller shafts is relatively forward of the support bracket 18.

Figure 6:
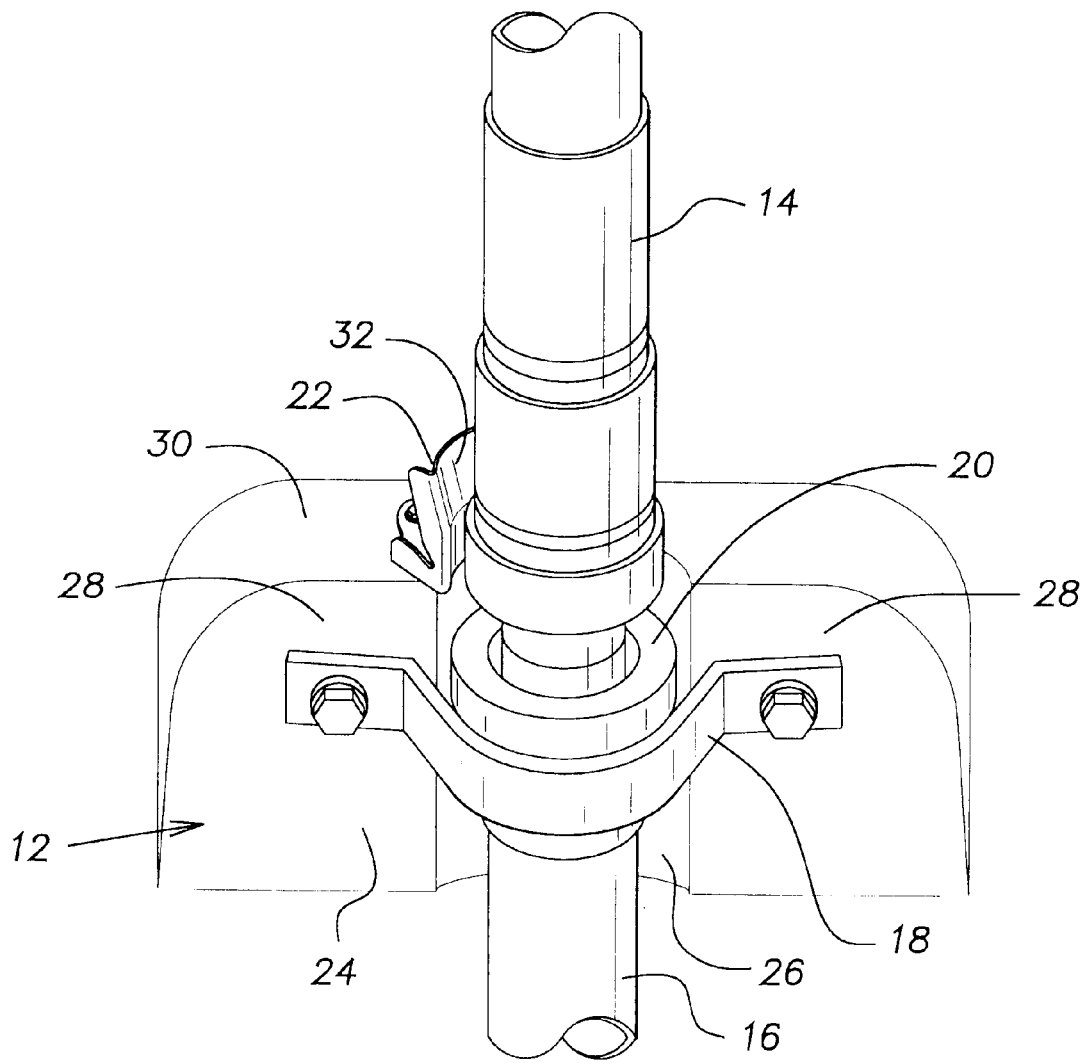
FIG. 6 is a view of a portion of the underside of a vehicle schematically illustrating mounting of the propeller shaft, support bracket, and deflector according to the present invention.

As shown best in FIG. 6, the support bracket 18 is secured to a lower surface of the vehicle at a predetermined position relative to the vehicle lower surface and the propeller shaft 10. The vehicle lower surface includes a mounting platform 24 that defines a semi-cylindrical depression 26 and a pair of mounting locations 28. The semi-cylindrical depression 26 receives a portion of the propeller shaft 10 or, more specifically, the resilient annular support member 20.

The mounting locations 28 are areas for attachment of the support bracket 18 and, as such, provide a boss on either side of the semi-cylindrical depression 26 for securement of ends of the support bracket 18 using conventional fastening techniques. A face 30 of the mounting platform 24 is disposed relatively forward of the mounting locations 28. The mounting platform face 30 is relatively transverse to a length direction of the semi-cylindrical depression 26 and relatively forward of the mounting bracket 18, as illustrated. The mounting platform face 30 is relatively behind the joint or union of the front and rear propeller shafts. As will be described more fully hereinafter, the deflector 22 is secured to the mounting platform face 30 at a location that is laterally spaced from the semi-cylindrical depression 26 and the longitudinal axis of the propeller shaft.

The annular resilient support member 20 surrounds the forward portion of the rear propeller shaft 16 and is, in turn, received between the support bracket 18 and the semi-cylindrical depression 26 of the mounting platform 24. The resilient support member 20 permits the propeller shaft 10 some range of lateral and longitudinal movement, and absorbs or dampens vibrations that are normally encountered during operation of the vehicle.

Although the deflector 22 according to the preferred embodiment of the present invention is illustrated in FIGS. 2–5, it is understood that the present invention is not limited to the specific structural features of the illustrated embodiment. Rather, it is clear that a deflector 22 in accordance with the present invention, as defined in the claims appended hereto, can take on many different shapes, and that the shape of any deflector according to the present invention will be specially adapted and designed for installation in a particular vehicle.

The deflector 22 includes a curved engagement surface 32 and a generally planar attachment surface 34. The attachment surface 34 includes a pair of mounting holes 36 through which fasteners extend to secure the deflector 22 to the mounting platform face 30, as described briefly hereinbefore. The engagement surface 32 is curved or concave, and generally is downwardly directed so as to be facing the propeller shaft 10 (FIGS. 1 and 6). Moreover, a distal end 32a of the engagement surface (i.e., the end remote from the attachment surface 34) is relatively higher than the proximal end 32b of the engagement surface (the end adjacent the attachment surface 34). As such, the engagement surface 32 slopes downwardly from its distal end 32a toward its proximal end 32b and, as will be appreciated by one skilled in the art, this sloping aids in re-directing the propeller shaft 10 relatively downwardly and through the center support 12. Lateral edges 32c of the engagement surface 32 and lateral edges 34a of the attachment surface lower portion are preferably bent at an angle to the surfaces, respectively, to help stiffen the surfaces 32, 34 and thereby support the load provided by engagement with the propeller shaft 10.

With reference to FIGS. 7a–7b, the relative position of the vehicle components and orientation of the propeller shaft 10 within the vehicle prior to a front-end collision is schematically illustrated. As shown, the vehicle includes a floor 54, a front sub-frame 40 having a series of frame bolts 42 and a rear sub-frame 43 having a series of mounts 44, 46 for the rear differential 48. The front and rear propeller shafts 14, 16 extend between the front and rear sub-frames 40, 43. The center support 12, including the center support bracket 18, is shown together with another support bracket 50 that is disposed between the center support bracket 18 and the front sub-frame 40. As shown best in FIG. 7b, due to manufacturing and assembly considerations, the front propeller shaft 14 slopes slightly upwardly as it extends rearward to the joint with the rear propeller shaft 16. The rear propeller shaft 16, on the other hand, is relatively horizontal as it extends rearwardly from the joint with the front propeller shaft 14. It is believed that the sloping orientation of the front propeller shaft 14 contributes to its tendency to jam at the central support 12 in the event of a front-end collision.

FIGS. 8a–8b schematically illustrate the components of the vehicle incorporating the present invention following a front-end collision. The front sub frame bolts 42 have been sheared, and the front propeller shaft 14 has buckled vertically, but without jamming. The front mounts 44 of the rear differential have been sheared, allowing the rear differential 48 to drop down and bottom out on the rear sub-frame 43. The front propeller shaft 14 has moved rearwardly through the center support 12. The net effect of all these actions is that the crash stroke of the engine and the propeller shaft 10 is increased. It is noted that, absent the deflector 22 of the present invention, the front propeller shaft 14 would have jammed at the center support 12 and, as such, would have effectively limited the crash stroke of the vehicle.

The present invention has been specifically described hereinbefore, but it is considered apparent that the present invention is not limited thereto. For example, it is contemplated that the shape and orientation of the deflector according to the invention will vary and be adapted for specific installations. Therefore, the scope of the invention is not limited to the preferred embodiment described herein, but rather is only defined by the claims appended hereto.

What is claimed is:

1. A central support structure for a vehicle propeller shaft, said central support structure being adapted to support the propeller shaft vertically relative to a lower surface of the vehicle and to permit said propeller shaft to move rearwardly during a front-end collision between the vehicle and another object, said central support structure comprising:

a support bracket secured to said vehicle lower surface at a first position along the length of the propeller shaft and surrounding at least a lower portion of said propeller shaft;

a resilient annular support substantially surrounding said propeller shaft at said first position and being supported by said support bracket; and, a deflector secured to said lower surface of said vehicle at a second position along the length of the propeller shaft, said second position being spaced a distance from said first position, said deflector being sized and positioned so as to guide the propeller shaft through the support bracket during a front-end collision.

2. The central support structure according to claim 1, wherein said propeller shaft has a longitudinal axis and a rotational direction, and said deflector is disposed at a position that is offset in said rotational direction from a vertical plane extending through said propeller shaft longitudinal axis.

3. The central support structure according to claim 2, wherein said second position is relatively forward of said first position.

4. The central support structure according to claim 1, wherein said deflector includes a curved surface that faces toward said propeller shaft, said curved surface being adapted to be engaged by said propeller shaft and direct said propeller shaft through said support bracket.

5. The central support structure according to claim 4, wherein said deflector includes an attachment surface that is directed transverse to a direction of said curved surface, said attachment surface being secured to said vehicle lower surface.

6. The central support structure according to claim 5, wherein said propeller shaft has a longitudinal axis and a rotational direction, and said deflector is disposed at a position that is offset in said rotational direction from a vertical plane extending through said propeller shaft longitudinal axis.

7. The central support structure according to claim 6, wherein said second position is relatively forward of said first position.

8. A central support structure for a vehicle propeller shaft, said structure being disposed at a first position along the length of said propeller shaft and being adapted to support the propeller shaft vertically relative to a lower surface of the vehicle, said support structure being adapted to permit said propeller shaft to move rearwardly during a front-end collision between said vehicle and another object, said central support structure including a support bracket and a resilient annular support, said support bracket being secured to said lower surface of said vehicle at said first position and surrounding at least a lower portion of said propeller shaft, said resilient annular support substantially surrounding said propeller shaft at said first position and being supported by said support bracket, the improvement comprising:

a deflector secured to said vehicle lower surface at a second position relative to the length of the propeller shaft, said second position being relatively forward of said first position, said deflector being adapted to guide the propeller shaft through the support bracket during a front-end collision.

9. The central support structure according to claim 8, wherein said deflector includes a curved surface that faces toward said propeller shaft, said curved surface being adapted to be engaged by said propeller shaft and direct said propeller shaft through said support bracket.

10. The central support structure according to claim 9, wherein said deflector includes an attachment surface that is directed transverse to a direction of said curved surface, said attachment surface being secured to said vehicle lower surface.

11. The central support structure according to claim 10, wherein said propeller shaft has a longitudinal axis and a rotational direction, and said deflector is disposed at a position that is offset in said rotational direction from a vertical plane extending through said propeller shaft longitudinal axis.

12. A method for increasing a crash stroke of a vehicle in a front-end collision, said vehicle including a propeller shaft and having a central support for said propeller shaft, said central support including a deflector, a support bracket and a resilient annular support, said resilient annular support being disposed around said propeller shaft and supported by said support bracket, said method comprising the steps of:

attaching the support bracket to said vehicle at a first location along the length of the propeller shaft;

attaching the deflector to said vehicle at a second location along the length of the propeller shaft, said second location being spaced from said first location; and during a front end collision, engaging said propeller shaft with said deflector; and, guiding said propeller shaft rearwardly through said support bracket and thereby increasing a crash stroke of the vehicle.

* * * * *